United States Patent [19]

Matsuoka et al.

[11] Patent Number: 4,587,663

[45] Date of Patent: May 6, 1986

[54] CONVERSATION DEVICE WITH SPACE AND FEED MOVEMENT RELATED TO ACTUATION TIME OF CONTROL KEY

[75] Inventors: Mikiharu Matsuoka, Tokyo; Hirohiko Katayama, Kawasaki; Sakae Horyu, Yokohama, all of Japan

[73] Assignee: Canon Kabushiki Kaisha, Tokyo, Japan

[21] Appl. No.: 367,725

[22] Filed: Apr. 12, 1982

[30] Foreign Application Priority Data

Apr. 21, 1981 [JP]  Japan .................................. 56-59131

[51] Int. Cl.⁴ .............................................. G06M 3/00
[52] U.S. Cl. ............................................ 377/2; 377/39;
    400/368; 400/321; 400/611
[58] Field of Search ....................... 377/2; 400/88, 368,
    400/369, 615.2; 235/58 CF; 340/365 R, 365 S

[56]  References Cited

U.S. PATENT DOCUMENTS

| 3,165,171 | 1/1965  | Baerswyl .......................... 377/2 |
| 3,808,363 | 4/1974  | Kieffer ...................... 340/365 R |
| 4,024,534 | 5/1977  | Du Vall ...................... 340/365 S |
| 4,096,935 | 6/1978  | Hanakata et al. ................... 400/88 |
| 4,106,011 | 8/1978  | Melanson et al. ............. 340/365 S |
| 4,293,855 | 10/1981 | Perkins ....................... 340/365 R |
| 4,323,888 | 4/1982  | Cole ................................ 400/368 |
| 4,444,520 | 4/1975  | Hanakata et al. .................... 400/88 |

Primary Examiner—Larry N. Anagnos
Assistant Examiner—K. Ohralik
Attorney, Agent, or Firm—Fitzpatrick, Cella, Harper & Scinto

[57]  ABSTRACT

The invention provides a conversation device having a space key for instructing feeding of a printing tape without printing, a pulse oscillator for producing pulses of predetermined period upon depression of the space key, a counter for counting the pulses generated from the pulse oscillator, a one-shot multivibrator for producing a pulse to indicate that the count value has reached a predetermined value, a flip-flop which is set by the pulse from the one-shot multivibrator and allows the pulses from the pulse oscillator to be supplied to a motor driver for amplifying the pulses and which is reset when the predetermined number of pulses from the pulse oscillator is received and prohibits the supply of the pulse oscillator to the motor driver, and a pulse motor for feeding the printing tape without printing. Therefore, when the flip-flop is set, the motor driver causes the pulse motor to drive the printing tape for a predetermined length corresponding to a plurality of characters. The device further includes a CPU for discriminating a depressed key and for supplying a signal to the motor driver which causes the pulse motor to drive the printing tape for a length corresponding to one character.

31 Claims, 13 Drawing Figures

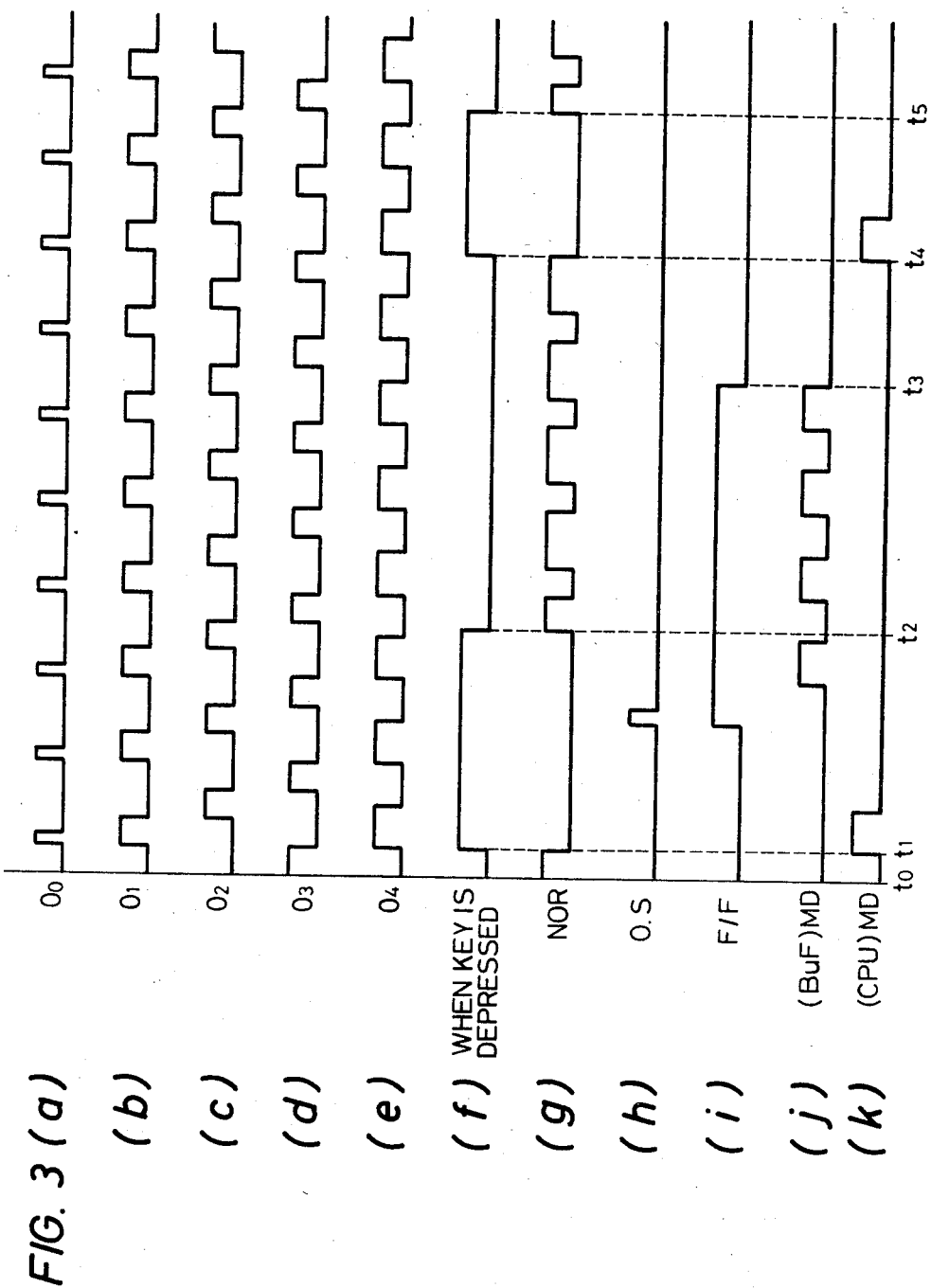

CONVERSATION DEVICE WITH SPACE AND FEED MOVEMENT RELATED TO ACTUATION TIME OF CONTROL KEY

BACKGROUND OF THE INVENTION

1. Field of the Invention

The present invention relates to a conversation device and, more particularly, to a conversation device for printing characters on a tape by depressing keys so that the user can present the printed tape to other people for conversation.

2. Description of the Prior Art

In a conventional conversation device of this type, the same key functions as a space key and a paper feed key. When the user depresses the key lightly, it functions as the space key which feeds the tape for a length corresponding to one character. However, when the key is strongly depressed, the same key functions as the paper feed key which feeds the tape for a desired length.

However, many users of the conventional conversation device are unable to coordinate voluntary muscular movement and to respond quickly. Even if the user wishes to depress the key to feed the tape for the length corresponding to one character, he may depress the key strongly. Thus, the paper feed mode is initiated against his will and unnecessary paper feeding is performed.

SUMMARY OF THE INVENTION

The present invention has been made to solve the above problem and has for one of its objects to provide a conversation device for preventing unnecessary tape feeding.

It is another object of the present invention to provide a conversation device for changing or selecting between a spacing function and a paper feed function in accordance with the duration for which a single key is depressed.

It is still another object of the present invention to provide a conversation device for changing the duration of depression that changes the spacing function to the paper feed function.

It is still another object of the present invention to provide a conversation device for changing the amount of a printing tape to be fed.

Other objects, features and advantages of the present invention will be apparent from the detailed description when taken in conjunction with the accompanying drawings.

BRIEF DESCRIPTION OF THE DRAWINGS

FIGS. 3(a) to 3(k) are timing charts of signals generated from each block of the conversation device shown in FIG. 2.

DETAILED DESCRIPTION OF THE PREFERRED EMBODIMENT

Figure 1:
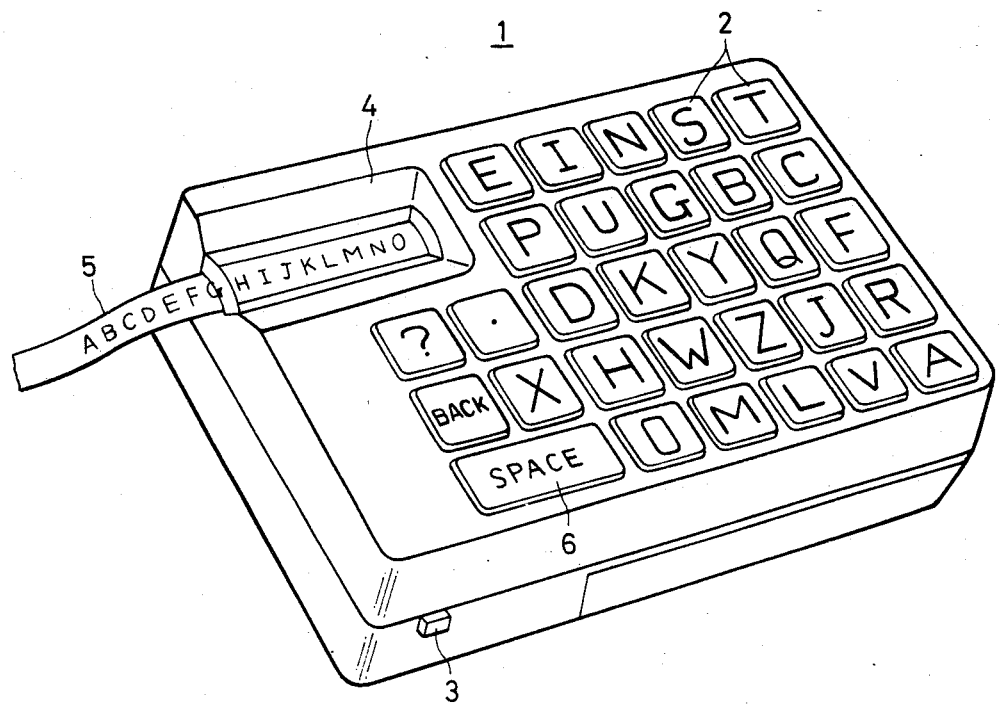
FIG. 1 is a perspective view of a conversation device according to one embodiment of the present invention.

FIG. 1 shows the outer appearance of a conversation device according to one embodiment of the present invention. A plurality of input keys are arranged on the upper surface of a conversation device 1. A printing tape or output medium means and a printing mechanism are housed in the conversation device 1.

When a power switch 3 is turned on, the conversation device 1 is operated. A printing tape 5 is fed from a display window 4 upon depression of one of the keys 2 and the character on the key 2 is entered in the device and visually output on the tape 5. If a space key 6 is normally depressed, the tape 5 is fed for a length corresponding to one character without printing a character. However, when the space key 6 is continuously depressed over a predetermined period of time, for example, one second or longer, the paper feed function is initiated. Thus, the tape 5 may be fed for a predetermined length corresponding to a few characters.

With the single space key, the space function and the paper feed function are changed, that is one or the other is selected, in accordance with the duration for which the space key 6 is depressed. If the user cannot coordinate voluntary muscular movement well, the paper feed function and the space function are easily changed without using a stroke key. When the paper feed function is initiated, the tape is automatically fed for a predetermined length corresponding to a few characters, so that the key need not be continuously depressed while the tape is being fed as in the conventional conversation device. Therefore, convenience is provided, especially for handicapped users.

Figure 2:
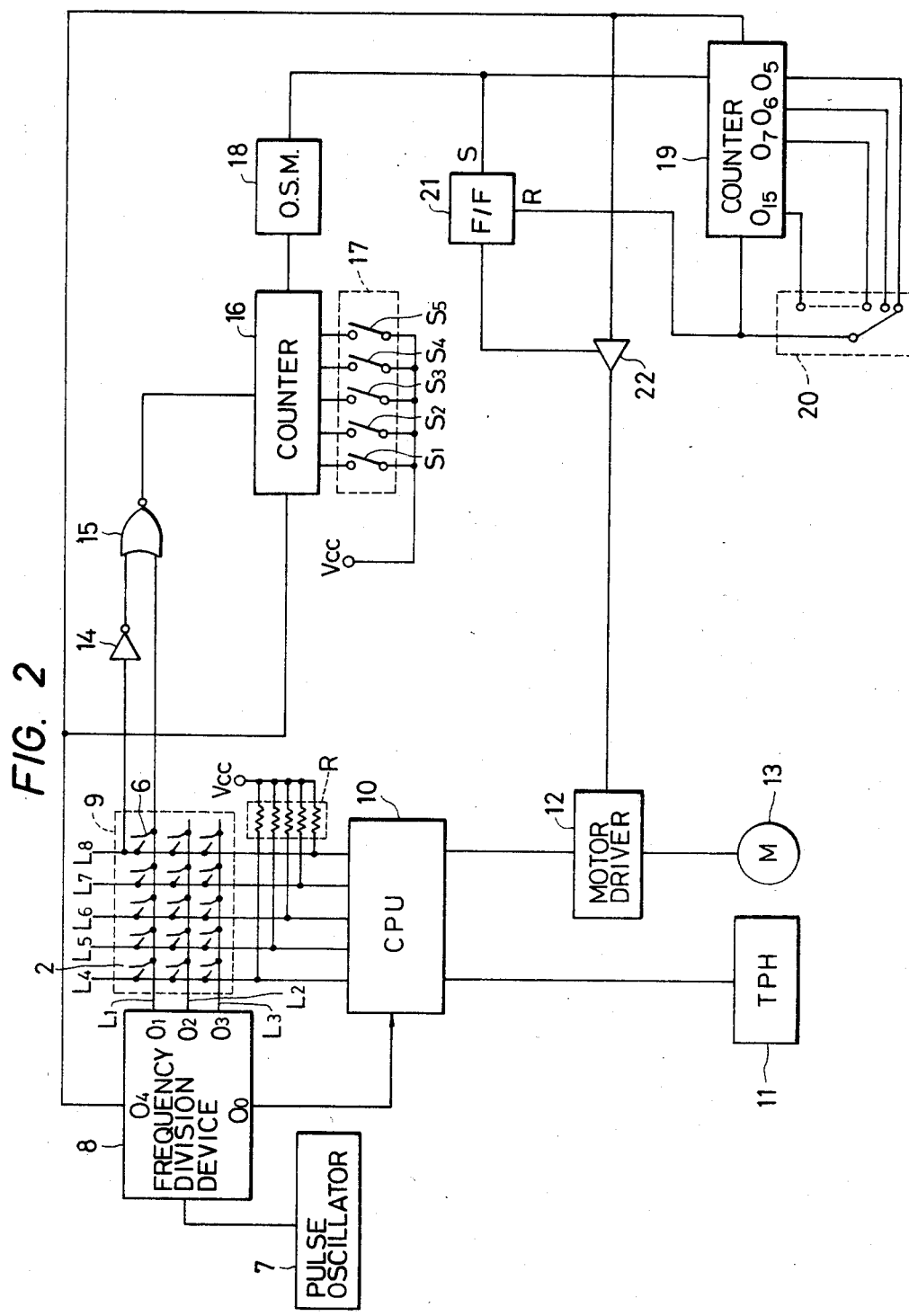
FIG. 2 is a block diagram of the overall arrangement of the conversation device shown in FIG. 1.

FIG. 2 is a block diagram of the overall arrangement of the conversation device shown in FIG. 1. A pulse oscillator 7 generates a pulse which is then supplied to a frequency divider 8. The frequency divider 8 frequency-divides the input pulse and produces outputs from output terminals $O_0$ to $O_4$, as shown in FIGS. 3(a) to 3(e). One output signal is generated per second from the output terminal $O_0$ of the frequency divider 8 and is used as a synchronizing signal. The pulses generated from the output terminals $O_1$ to $O_3$ are supplied to a CPU (central processing unit) 10 upon depression of one of the keys of a key input section 9. Thus, the CPU 10 discriminates which one of the keys is depressed. One pulse is generated per second from the output terminal $O_4$ to drive a pulse motor 13. The key input section 9 comprises row lines $L_1$ to $L_3$ of a conductive material and column lines $L_4$ to $L_8$ of a conductive material. When one of the keys 2 is turned on or off, the lines $L_1$ to $L_3$ and $L_4$ to $L_8$ arranged in a matrix form in the key input section 9 are connected or disconnected. The space key 6 shown among the keys 2 in FIG. 1 is included in the key input section 9. A voltage $V_{CC}$ is applied to the lines $L_4$ to $L_8$ through a resistor R. Upon depression of one of the keys 2, the CPU 10 receives one of the pulses generated from the output terminal $O_1$ to $O_3$ of the frequency divider 8. The CPU 10 discriminates the depressed key in accordance with the relation between the timing of the input pulse and the timing of the pulse from the output terminal $O_0$ from the frequency divider 8. The CPU 10 then supplies a signal indicating a character pattern of the corresponding key to a thermal head 11. Simultaneously, the CPU 10 supplies a signal to cause a motor driver 12 to drive the pulse motor 13, which thus comprises an input character display position displacing means. The motor driver 12 amplifies the pulse and supplies it to the pulse motor 13. An inverter 14 inverts the output signal from the output terminal $O_1$ from the frequency driver 8 upon depression of the space key 6. An output from the inverter 14 is supplied to one of the input terminals of a NOR circuit 15. The NOR circuit 15 also receives the signal from the output terminal $O_1$ of the frequency divider 8 at its other input terminal. A counter 16 is reset when the output of level "1" is produced from the NOR circuit 15. Thus, the count value of the counter 16 is cleared. However, if the signal of level "0" is supplied to the counter 16, the counter 16 is set and starts counting the pulse generated from the output terminal $O_4$ of the frequency divider 8. A data set switching circuit 17 which comprises a plurality of switches sets the count value of the counter 16. When a desired switch of the data set switching circuit 17 is depressed, a desired value is set in the counter 16. The counter 16 produces a coincidence signal when the value set by depression of the desired switch in the data set switching circuit 17 coincides with the number of pulses generated from the output terminal $O_4$ of the frequency divider 8. In this case, the value set by the desired switch in the data set switching circuit 17 will be the time interval for which depression of the space key 6 causes the space function to be changed to the paper feed function. These switches can be actuated by a button or key (not shown) located conveniently on the device 1, sometimes on the bottom or sides thereof, since the switches will usually be actuated only occasionally. A one-shot multivibrator 18 produces a one-shot pulse when the coincidence signal is supplied from the counter 16. When the one-shot pulse from the one-shot multibivrator 18 is supplied to a counter 19, the counter 19 is set to count the pulse from the output terminal $O_4$ of the frequency divider 8. The counter 19 produces signals from output terminals $O_5$ to $O_{15}$ in accordance with the count values and is then reset to clear the count value. If the count value is 4, a signal is generated from the output terminal $O_5$ of the counter 19. When the count value is incremented to 5, a signal is generated from the output terminal $O_6$. A selection switch 20 selects the outputs from the output terminals $O_5$ to $O_{15}$ of the counter 19. With this selection switch 20, the desired length of the printing tape to be fed in the paper feed function corresponding to a few characters is set. This selection switch can be actuated similarly to the switching circuit 17. A flip-flop 21 is set by the pulse from one-shot multivibrator 18 and is reset by the signal from the counter 19. A tristate buffer 22 inhibits the supply of the pulse from the output terminal $O_4$ of the frequency divider 8 to the motor driver 12 when the output from the flip-flop 21 is at low level. However, when the output from the flip-flop 21 is at high level, the tristate buffer 22 causes the pulse from the output terminal $O_4$ of the frequency divider 8 to be supplied to the motor driver 12.

The mode of operation of the conversation device with the above arrangement will be described with reference to timing charts in FIGS. 3(a) to 3(k). If the user depresses the key 6 for 2 seconds or less, the space key 6 acts in the space mode and feed of the printing tape 5 for a length corresponding to one character occurs. However, if the user depresses the space key 6 over 2 seconds, the space key 6 acts in the paper feed mode and feed of the printing tape 5 for a length corresponding to four characters occurs. Assume that the user depresses the switch $S_2$. The count value of the counter 16 is set to 2. The selection switch 20 selects the output from the output terminal $O_5$ of the counter 19 to feed the printing tape 5 for a length corresponding to four characters. As shown in FIG. 3(f), when the user depresses the space key 6 at time $t_1$, the pulse from the output terminal $O_1$ of the frequency divider 8 is supplied to the CPU 10. The CPU 10 discriminates that the depressed key is the space key 6 in accordance with the relation between the timing of the synchronizing signal from the output terminal $O_0$ of the frequency divider 8 and the timing of the signal supplied from the depressed key. The CPU 10 then supplies a signal to the motor driver 12, as shown in FIG. 3(k). The motor driver 12 amplifies the input signal from the CPU 10 and supplies it to the pulse motor 13. The pulse motor 13 then drives the printing tape 5 for a length corresponding to one character. Meanwhile, the output from the NOR circuit 15 goes low level at time $t_1$, as shown in FIG. 3(g). The counter 16 starts counting the pulse from the output terminal $O_4$ of the frequency divider 8. If the space key 6 is continuously depressed until time $t_2$ three pulses from the output terminal $O_4$ of the frequency divider 8 are supplied to the counter 16, which functions to count the driving time interval during which the key 6 is depressed. However, when the count value reaches the preset count value "2" set by the data set switching circuit 17, the signal of level "1" is supplied to the one-shot multivibrator 18 from the counter 16. The signal from the one-shot multivibrator 18 is supplied to the set terminal of the flip-flop 21, as shown in FIGS. 3(h) and 3(i). Thus, the flip-flop 21 is set. The signal from the one-shot multivibrator 18 is also supplied to the counter 19. The counter 19 is set and starts counting the pulse from the output terminal $O_4$ of the frequency divider 8. The pulse from the output terminal $O_4$ of the frequency divider 8 is supplied to the tristate buffer 22. While the flip-flop 21 is at high level, the tristate buffer 22 supplies the pulse to the motor driver 12. Although the counter 19 counts the pulse signal from the output terminal $O_4$ of the frequency divider 8, the signal from the output terminal $O_5$ is supplied to the reset terminal of the flip-flop 21 through the selection switch 20 when the count value of the counter 19 reaches 4. Thus, the flip-flop 21 goes low level, as shown in FIG. 3(i). Further, the tristate buffer 22 is reset. Thereafter, the pulse generated from the output terminal $O_4$ of the frequency divider 8 cannot be supplied to the motor driver 12. Therefore, when the flip-flop 21 is kept in the set status, the pulse shown in FIG. 3(j) is supplied to the motor driver 12 and the printing tape 5 is fed for a length corresponding to four characters. When the user continues to depress the space key 6 over 2 seconds, the printing tape 5 is fed for the length corresponding to one character and is further fed for a predetermined length corresponding to 4 characters.

When the user depresses the space key 6 for two seconds or less or a time interval between time $t_4$ and $t_5$ as shown in FIGS. 3(f) and 3(g), the counter 16 repeats the set and reset statuses. Since the output does not appear at the one-shot multivibrator 18, the CPU 10 discriminates that the paper feed mode is not initiated and supplies the pulse to the motor driver 12 for driving the printing tape 5, as shown in FIG. 3(k). The motor driver 12 amplifies the signal and supplies the signal to the pulse motor 13 for driving the printing tape 5 for the length corresponding to one character.

In the above embodiment, the data set switching circuit 17 functions to set the count value of the counter 16 to 2. The selection switch 20 functions to set the count value of the counter 19 to 4. Therefore, with the data set switching circuit 17 and the selection switch 20, the timing for changing the space mode to the paper feed mode with the space key 6 and the length (number of characters) of the printing tape to be fed may be arbitrarily set.

In accordance with time intervals for which the space key 6 is depressed, the space function is changed to the paper feed function. Further, the printing tape can be fed for a desired length, thus preventing the waste of the printing tape.

The present invention is not limited to a conversation device but may be embodied in a journal printer for an electronic calculator or the like. The same key functions to perform the space mode and the paper feed mode. A time interval between the space mode and the paper feed mode is shortened and the printing tape is fed until the last printed character appears outside the paper cutter. With the above arrangement, a special key-in operation for the conventional paper feed mode is not required. The space mode is changed to the paper feed mode by a single key-in operation.

In summary, according to the present invention, an arrangement is adopted wherein the space mode is changed to the paper feed mode in accordance with a predetermined time interval for which the space key is continuously depressed. A two-stroke key is eliminated and a conversation device with excellent operability is provided. Even handicapped users can easily use the conversation device according to the present invention. Further, the time interval for changing the space mode to the paper feed mode can be arbitrarily determined. Further, the printing tape can be fed for a desired length. Therefore, the conversation device according to the present invention can be used easily by heavily or mildly handicapped users.

What we claim is:

1. A recording medium feeding device comprising:
   key means for instructing feeding of a recording medium;
   pulse generating means for generating pulses of a predetermined period upon actuation of said key means;
   a counter for counting the pulses generated by said pulse generating means;
   data setting means for setting a desired value to be counted by said counter; and
   recording medium feeding means for feeding the recording medium a predetermined amount when the count by said counter reaches a value set by said data setting means.

2. A device according to claim 1, wherein said data setting means comprises a plurality of switches for setting said desired value in said counter.

3. A device according to claim 1, wherein said recording medium feeding means comprises a motor driving circuit for amplifying the pulses generated by said pulse generating means and a pulse motor for feeding the recording medium in response to such amplified pulses.

4. A conversation device comprising:
   a key for instructing feeding of a recording medium without printing;
   means for generating pulses of a predetermined period upon depression of said key;
   detecting means for counting the pulses generated by said pulse generating means to detect the passage of a time interval for which said key is depressed;
   counting means for counting the pulses to obtain a desired number of pulses generated by said pulse generating means, in response to the detection by said detecting means; and
   feeding means for feeding the recording medium a predetermined amount in response to the count of the desired number of pulses by said counting means.

5. A conversation device according to claim 4, wherein said detecting means comprises a counter for counting the pulses generated by said pulse generating means and a one-shot multivibrator for producing a pulse representing that the count by said counter has detected the passage of a predetermined time interval.

6. A conversation device according to claim 4, wherein said counting means comprises a counter for counting the pulses generated by said pulse generating means and a plurality of switches for setting the desired number of pulses.

7. A conversation device according to claim 4, wherein said feeding means comprises a motor driving circuit for amplifying the pulses and a pulse motor for feeding the recording medium without printing in response to such amplified pulses.

8. A recording medium feeding device comprising:
   key means for instructing feeding of a recording medium;
   pulse generating means for generating pulses of a predetermined period upon actuation of said key means;
   first counting means for counting the pulses generated by said pulse generating means;
   data setting means for setting a desired value to be counted by said first counting means;
   second counting means for counting pulses generated by said pulse generating means when the count by said first counting means reaches a value set by said data setting means; and
   recording medium feeding means for feeding the recording medium until the number of pulses counted by said second counting means reaches a predetermined value.

9. A recording medium feeding device according to claim 8, wherein said first counting means comprises a counter.

10. A recording medium feeding device according to claim 8, wherein said data setting means comprises a plurality of switches.

11. A recording medium feeding device according to claim 8, wherein said counting means comprises a counter.

12. A recording medium feeding device according to claim 8, wherein said recording medium feeding means comprises a motor driving circuit for amplifying the pulses generated by said pulse generating means and a pulse motor for feeding the recording medium in response to the pulses amplified by said motor driving circuit.

13. A character display device comprising:
   output medium means for visually outputting a character entered into said device;
   key means for instructing displacement of said output medium means by an amount at least equal to the display position of one character entered into said device;
   pulse generating means for generating pulses of a predetermined period upon the actuation of said key means;
   detecting means for counting the pulses generated by said pulse generating means to detect the passage of a time interval for which said key is actuated;
   counting means for counting the pulses to obtain a desired number of pulses generated by said pulse generating means when said detecting means detects the passage of a time interval having a predetermined length, and input character display position displacing means for displacing the display position of characters entered on said output medium means by a length corresponding to a predetermined and desired number of characters in response to the desired number of pulses obtained by said counting means.

14. A character display device according to claim 13, wherein said detecting means comprises a counter for counting the pulses generated by said pulse generating means and a one-shot multivibrator for producing a pulse representing that a count value of said counter is a predetermined number.

15. A character display device according to claim 13, wherein said display position displacing means comprises a motor driving circuit for amplifying the pulses generated by said pulse generating means and a pulse motor for feeding the recording medium in response to said pulses amplified by said motor driving circuit.

16. A character display device according to claim 13, wherein said counting means comprises a counter for counting the pulses generated by said pulse generating means and a plurality of switches for setting the desired number of pulses.

17. A recording medium feeding device comprising:
key means for generating an instruction to feed a recording medium;
key driving time interval counting means for counting a driving time interval of said instruction generated by said key means;
signal generating means for generating a signal when the driving time interval of said instruction counted by said key driving time interval counting means exceeds a predetermined value; and
recording medium feeding means for feeding the recording medium a predetermined amount in response to a signal from said signal generating means.

18. A recording medium feeding device according to claim 17, wherein said driving time interval counting means comprises a counter.

19. A recording medium feeding device according to claim 17, wherein said signal generating means comprises a one-shot multivibrator.

20. A recording medium feeding device according to claim 17, further comprising data setting means for arbitrarily setting said length corresponding to a desired number of characters.

21. A recording medium feeding device comprising:
instructing means for generating an instruction to feed a recording medium;
discriminating means for discriminating whether a driving time interval of an instruction generated by said instruction means exceeds a predetermined time interval;
control means for controlling feeding of a first predetermined length of said recording medium when said discriminating means discriminates that a driving time interval of said instruction is within the predetermined time interval and for controlling feeding of a second predetermined length longer than said first predetermined length of said recording medium when said discriminating means discriminates that the driving time interval of said instruction exceeds the predetermined time interval; and
recording medium feeding means for feeding said recording medium in accordance with the control of said control means.

22. A recording medium feeding device according to claim 21, wherein said discriminating means comprises a counter.

23. A recording medium feeding device according to claim 21, further comprising data setting means for setting the first predetermined length and the second predetermined length.

24. A recording medium feeding device according to claim 21, wherein said recording medium feeding means comprises a step motor.

25. A recording medium feeding device according to claim 21, means for varying said predetermined time interval for discrimination by said discriminating means.

26. A recording medium feeding device according to claim 21, for use with apparatus for printing characters, wherein the first predetermined length corresponds to a length corresponding to one character.

27. A typewriter device comprising:
key input means for providing character input, said key input means including a space key;
signal generating means for generating signals;
counting means for counting signals generated by said signal generating means in response to sustained depression of said space key; and
moving means for moving a print paper by a predetermined length when the count by said counting means reaches a predetermined value.

28. A typewriter device according to claim 27, wherein said moving means is a pulse motor.

29. A typewriter according to claim 27, further comprising print means for printing characters inputted by said key input means.

30. A typewriter device according to claim 27, further comprising switch means for changing the predetermined value.

31. A typewriter according to claim 27, further comprising switch means for changing the predetermined length.

* * * * *

UNITED STATES PATENT AND TRADEMARK OFFICE
CERTIFICATE OF CORRECTION

PATENT NO. : 4,587,663  Page 1 of 2
DATED : May 6, 1986
INVENTOR(S) : Mikiharu Matsuoka, et al.

It is certified that error appears in the above-identified patent and that said Letters Patent is hereby corrected as shown below:

Under "References Cited", change "4,444,520 4/75" to --4,444,520 4/84--.

Column 2, line 14, change "is one" to --is, one--.

Column 3, line 25, change "multibivrator" to --multivibrator--; and line 40, change "from one-shot" to --from the one-shot--.

Column 4, line 12, change "$t_2$ three" to --$t_2$, three--.

Column 6, line 42, change "said counting" to -- said second counting--.

UNITED STATES PATENT AND TRADEMARK OFFICE
CERTIFICATE OF CORRECTION

PATENT NO. : 4,587,663

DATED : May 6, 1986

INVENTOR(S) : Mikiharu Matsuoka, et al.

It is certified that error appears in the above-identified patent and that said Letters Patent is hereby corrected as shown below:

Column 8, line 28, before "means" insert --further comprising--; and line 46, change "typewriter according" to --typewriter device according--.

Signed and Sealed this

Thirteenth Day of January, 1987

Attest:

DONALD J. QUIGG

*Attesting Officer*      *Commissioner of Patents and Trademarks*